J. LA DOW.
TRACTION WHEEL.
APPLICATION FILED JUNE 1, 1917.

1,253,056.

Patented Jan. 8, 1918.
3 SHEETS—SHEET 1.

WITNESSES

INVENTOR
John La Dow
BY Victor J. Evans
ATTORNEY

J. LA DOW.
TRACTION WHEEL.
APPLICATION FILED JUNE 1, 1917.

1,253,056.

Patented Jan. 8, 1918.
3 SHEETS—SHEET 2.

INVENTOR
John La Dow

WITNESSES

BY Victor J. Evans
ATTORNEY

J. LA DOW.
TRACTION WHEEL.
APPLICATION FILED JUNE 1, 1917.
1,253,056.
Patented Jan. 8, 1918.
3 SHEETS—SHEET 3.
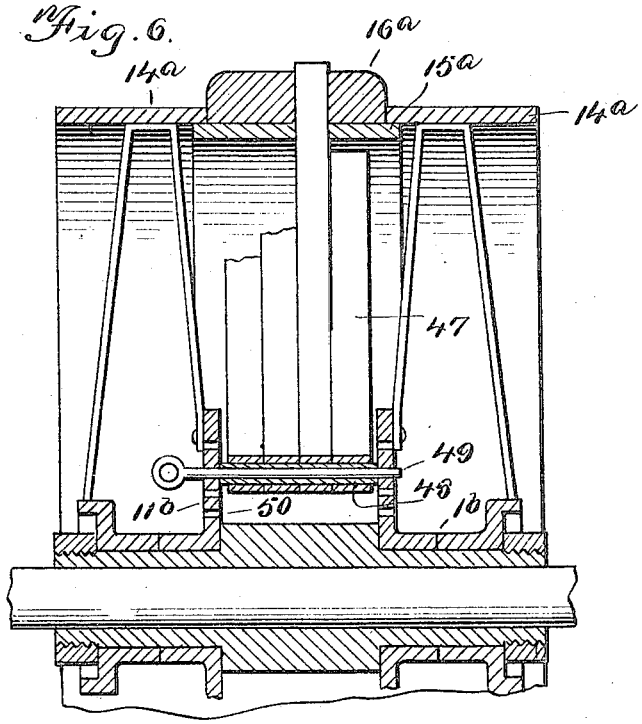
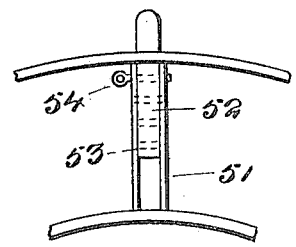
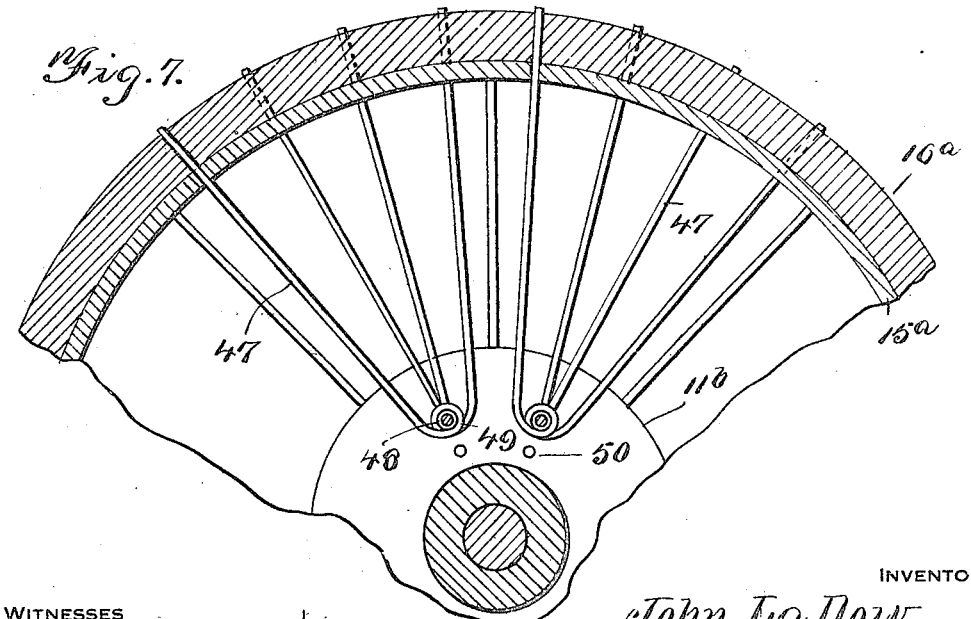
WITNESSES
INVENTOR
John La Dow
BY Victor J. Evans
ATTORNEY

UNITED STATES PATENT OFFICE.

JOHN LA DOW, OF LOS ANGELES, CALIFORNIA, ASSIGNOR OF ONE-HALF TO PERRY WHITING, OF LOS ANGELES, CALIFORNIA.

TRACTION-WHEEL.

1,253,056.

Specification of Letters Patent.

Patented Jan. 8, 1918.

Application filed June 1, 1917. Serial No. 172,310.

*To all whom it may concern:*

Be it known that I, JOHN LA DOW, a citizen of the United States, residing at Los Angeles, in the county of Los Angeles and State of California, have invented new and useful Improvements in Traction-Wheels, of which the following is a specification.

This invention relates to traction wheels, the primary object of the invention being to produce a traction wheel especially designed to take the place of the driving wheels of a motor vehicle in order to render the same practical for use as a tractor for farming, hauling, towing and other purposes which will suggest themselves to the manufacturer and the general public.

One of the chief aims of the invention is to provide a wheel embodying traction members or elements movable through openings in the rim or tire of the wheel and capable of being projected or retracted to any desired extent to adapt the wheel as a whole to operate on hard and soft road surfaces or in fields, also adapting the wheel to be used in the various seasons of the year.

The invention also contemplates novel means for projecting and retracting said traction members, said means being under the control of the operator of the tractor or motor vehicle in conjunction with which the tractor wheels are employed.

Another object of the invention is to construct the wheel as a whole in such manner that the parts thereof may be readily assembled and disassociated for repairs, giving ready accessibility to all the working parts thereof which are subjected to wear.

Another object of the invention is to construct the hub of the wheel in such manner that it serves as a container for lubricating material in which the main working parts of the traction member operating mechanism are mounted.

Another and important object of the invention is to produce a wheel which may be used either as a traction wheel or as an ordinary carrying wheel, the tires and traction members being so disposed and related, that the wheel may run either upon tires of the solid or cushion type or any other type with the traction members withdrawn so as not to contact with the road surface, or said traction members may be projected beyond the peripheries of the tires to obtain the necessary tractional hold on the road surface or field where the machine is being used. This brings the traction wheel as a whole within the requirements of the "good road laws" enacted and being enacted in various sections of the country.

With the above and other objects in view, the invention consists in the novel construction, combination and arrangement of parts, herein described, illustrated and claimed.

In the accompanying drawings:—

Fig. 6 is a similar view of a wheel having a modified form of rim and a modified arrangement of traction members.

Fig. 7 is a fragmentary vertical longitudinal section of the same.

Fig. 8 is a fragmentary sectional view similar to Fig. 7 showing another arrangement of traction members.

Figure 2:
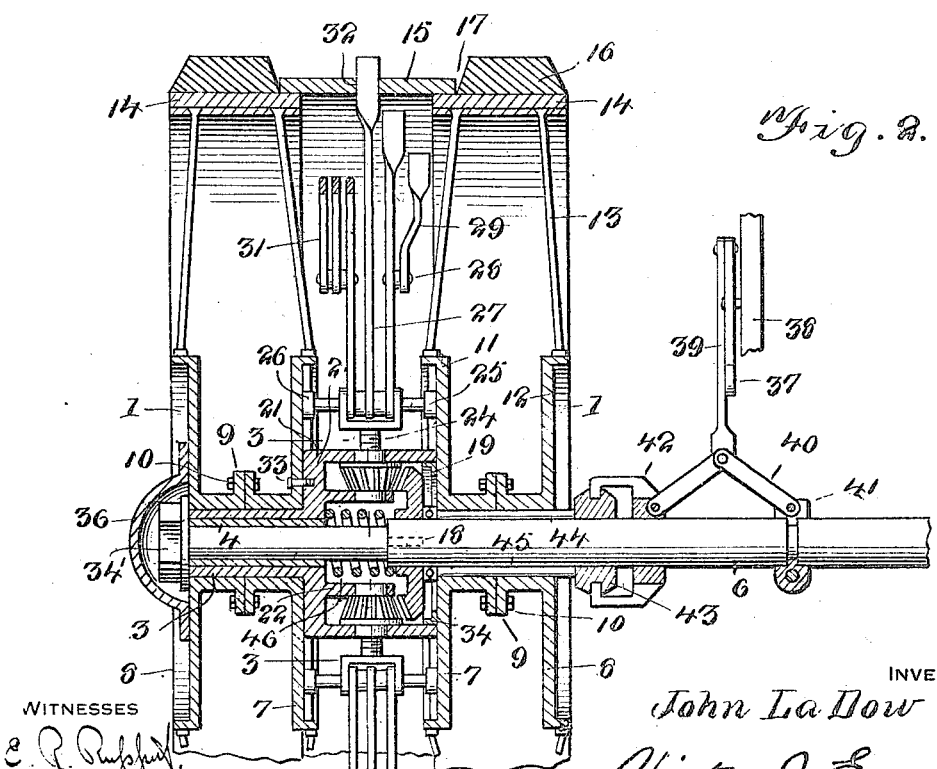
Fig. 2 is a diametrical section through the same taken in line with the axle which is shown in elevation.

The hub of the traction wheel, in the preferred embodiment thereof, and as best illustrated in Fig. 2, is composed of two side or end hub members 1 and a central hub member 2 tightly held and fastened between the side members 1. In the embodiment of the invention as illustrated in Fig. 2, the central hub member 2 is formed with an outwardly projecting tubular bearing extension or sleeve 3 which surrounds a bushing 4 around a reduced portion 5 of the axle 6 upon which the wheel as a whole is mounted.

Each of the outer hub members 1 is preferably made in two sections 7 and 8 and these sections are provided with meeting flanges 9 secured together by fastening means 10. Each of the hub members 1 is provided with inner and outer circumferential flanges 11 and 12 to which are fastened the inner ends of series of spokes 13 which extend outwardly where they are fastened to one of the lateral annular sections 14 of a rim which also comprises a central section 15 overlapping the outer sections 14 along the lateral margins thereof. Fastened in any suitable way upon the lateral rim sections 14 are tires 16 preferably of the cushion type such as solid rubber or rubber combined with a suitable fabric. These tires 16 have a bearing against the shoulders 17 formed by the opposite lateral edges of the central section 15 of the rim as clearly shown in Fig. 2 and said tires project at their tread surface a considerable distance beyond the outer or peripheral face of the central or rim section 15, the advantage of which will presently appear.

Figure 1:
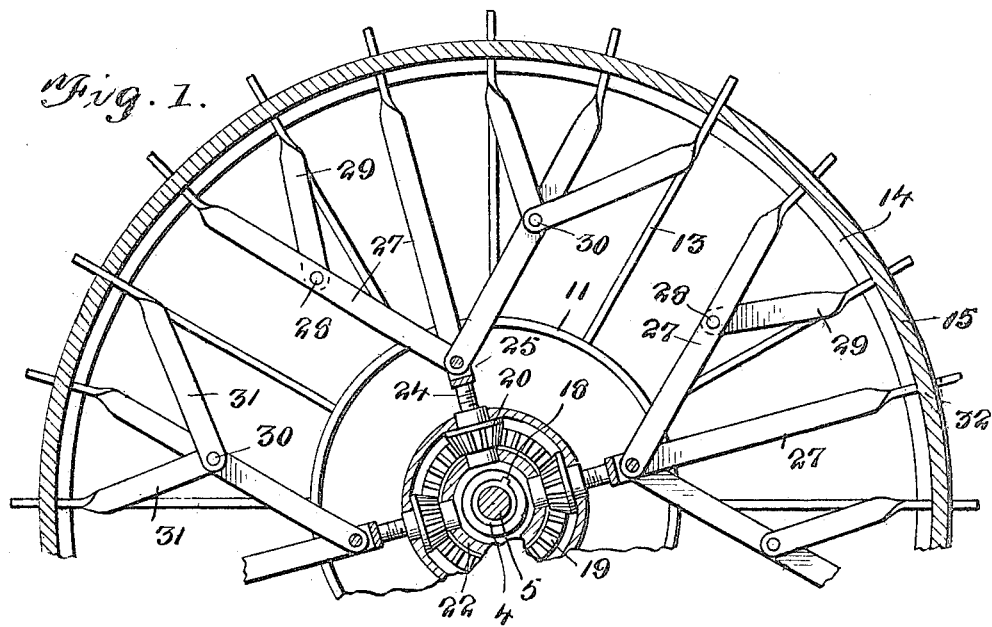
Figure 1 is a vertical sectional view of a traction wheel embodying the present invention in one of the preferred forms thereof.
Figure 3:
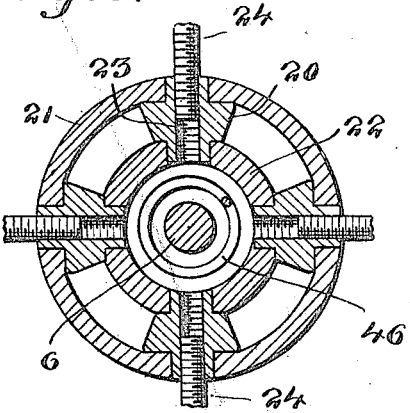
Fig. 3 is a fragmentary section on the line 3—3 of Fig. 2.
Figure 4:
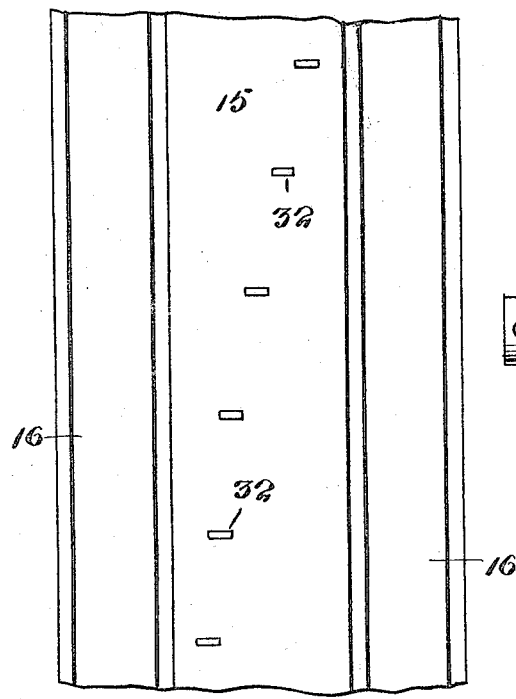
Fig. 4 is a plan view of a portion of the wheel rim looking toward the outer face thereof and showing the arrangement of the traction members.

Secured to the axle 6 preferably by means of a removable key 18 is a master gear 19 shown of the beveled type, said gear meshing with a circular series of pinions 20. There are preferably four of such pinions and each of said pinions is mounted between the outer rim 21 of the central hub member 2 and an inner rim or series of lugs 22, as shown in Figs. 2 and 3. Each of said pinions has a central internally threaded bore 23 through which is inserted one of a corresponding series of feed screws 24 carrying at its outer end a cross head 25 which is disposed laterally or which extends from one of the flanges 11 to the other flange 11 of the hub members 1. The cross head 25 carries at the ends thereof rollers 26 which ride against the flanges 11 to enable the cross head to work freely in an outward or inward direction, it being obvious that as the pinions 20 are turned, the feed screws 24 and cross heads 25 will be moved outwardly or inwardly in radial paths. 27 designates traction members which are pivotally connected at their inner ends to each cross head 25. Under the embodiment of this part of the invention shown in Fig. 1, three of such traction members 27 are connected to each cross head 25. Connected pivotally at 28 to one of the traction members 27 is another traction member 29. Pivotally connected to the other traction member 27 at 30 are two other traction members 31. At their outer ends, all of the traction members pass slidingly through slots or openings 32 in the central rim section 15. There are four groups of traction members arranged in accordance with the foregoing description and the traction members of each group are arranged in the relation to each other illustrated in Figs. 1, 2 and 4, it being noted that in Fig. 4 the openings 32 are offset laterally and progressively throughout the series. In other words the outer ends of the traction members of each group are out of circumferential or longitudinal alinement with each other. This increases the breadth of the gripping action of the different groups of traction members on the road or field surface.

The central hub member 2 may be fastened to the side hub members 1 by screws, bolts or other fastening means 33. In order to support the free edge of the rim 21, one of the side hub members 1 is provided on the inner face thereof with an annular ledge 34 as shown in Fig. 2 to which the rim 21 may be fastened in any suitable way. 34' represents an axle cap or nut to hold the wheel on the axle, and 36 designates a hub cap for excluding foreign matter from the inside of the hub.

The means for actuating or projecting and retracting the traction members, comprises a lever 37 which may either be a foot lever or a hand lever. This lever is mounted on the frame 38 of the machine at a suitable point and has connected thereto a link rod 39 in turn connected to toggle links 40. One of the toggle links is connected to a fixed collar or support 41 on the axle 6 while the other toggle link is connected to a slidable shifting collar 42 movable longitudinally of the axle 6. The shiftable collar 42 in turn engages a thrust collar 43 also slidable on the axle 6. Bearing rollers 44 are interposed between the axle 6 and the adjacent side hub member 1 and several of said rollers, preferably four in number, are made of greater length than the others so as to act as thrust pins, the inner extremities thereof coöperating with an end thrust ball bearing 45 which abuts the master gear 19 hereinabove described. By the means just described, the master gear 19 may be thrust into mesh with the pinions 20 so as to impart rotary motion to the latter for the purpose set forth. When the lever 37 is released, the gear 19 is thrust out of engagement with the pinions 20 by means of a coiled expansion spring 46 encircling the reduced portion 5 of the axle. By providing the axle 6 with such reduced portion 5, the bushing 4 may be removed and also the spring 46, and key 18. This gives access to all the working parts within the central hub member 2.

Figure 5:
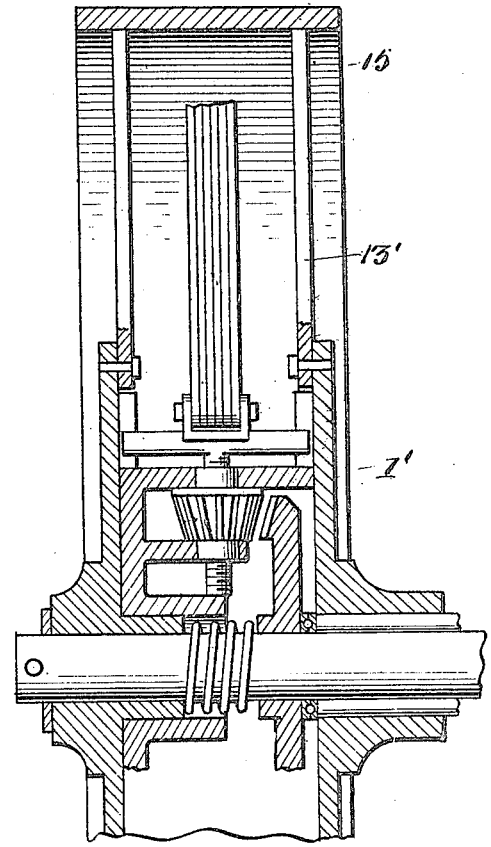
Fig. 5 is a radial section through a traction wheel embodying the present invention, showing a modified form thereof.

In some cases, where the traction wheel is to be used in conjunction with lighter farm machinery such for example as "orchard" tractors, the lateral rim sections 14 may be omitted, the central rim section 15 being retained, and the spokes 13' being connected at their outer ends thereto. The end hub sections 1' will also be correspondingly altered as shown in Fig. 5. The wheel illustrated in Fig. 5 embodies however the same general principles as the one previously described.

Under the construction and arrangement illustrated in Fig. 6, the central rim section 15ᵃ is arranged innermost, the lateral sections 14ª overlapping the section 15ª. In such event a single tire 16ª will be placed around the rim section 15ª and between the shoulders formed by the inner edges of the lateral rim sections 14ª. The central rim section as well as the tire will be formed with openings to receive and admit of the projection and retraction of a series of traction members 47 (see Figs. 6 and 7), said traction members being arranged in groups as shown and the members of each group being journaled upon a common tube 48 through which a detachable pin 49 is inserted, said pin passing through the inner flanges 11ᵇ of the side hub members 1ᵇ. The flanges 11ᵇ are formed with radially extending rows or series of holes 50 to receive the pins 49 and this enables the groups of traction members 47 to be moved outwardly and inwardly to provide any degree of projection thereof.

Under the arrangement illustrated in Fig. 8, the wheel has fixedly attached thereto radially extending socket members 51 each of which is of hollow formation and forms a guide for an individual traction member 52 which is formed with a longitudinal series of holes 53 to receive a fastening pin 54 which is insertible transversely through the socket member 51. This also provides for any degree of projection of the outer pointed extremities of the traction members 52.

From the foregoing description taken in connection with the accompanying drawings it will now be seen that I have produced a traction wheel of sectional construction that may be assembled and disassembled in the field or on the road without specially skilled labor or serious loss of time, and furthermore one which may be repaired economically should breakage occur; also a traction wheel which provides for long and efficient lubrication of the working parts thereof which are protected from dirt, dust and other foreign matter in a practical manner. One of the chief merits of the invention resides in the means for operating the traction members to obtain any desired projection thereof or a full and complete withdrawal of the outer extremities thereof so that the wheel may be used not only for traction purposes but for towing, hauling and various other uses. The wheel conforms to traffic and police regulations and may be operated on any road without injury thereto as the outer extremities of the spikes may be retracted to a point where they cannot possibly come in contact with the road surface. When the traction member operating mechanism is not in use, all parts thereof including the gears are idle and not subjected to wear. Where no tires are placed around the rim, it is preferred to employ the rim construction shown in Fig. 6 which enables the outer extremities of the traction members to be retracted within the peripheral faces of the lateral rim sections. The traction elements are preferably formed of flat bars each given a quarter twist so that the inner ends thereof may be more closely assembled where they connect to the cross heads of the feed screws. It is also preferred to use a separate and independent operating lever for each traction wheel as this permits the operator to use the traction members at one side of the machine and not at the other, should circumstances require.

I claim:—

1. In a traction wheel, a hub, a rim having openings therein, spokes connecting said hub and rim, a plurality of feed screws radially movable in relation to said hub and provided at their outer ends with cross heads, traction members having their inner ends attached to said cross heads and their outer ends arranged in the openings of the rim, pinions having a threaded engagement with said feed screws, a master gear for simultaneously revolving all of said pinions, means for shifting said master gear into mesh with said pinions, means for throwing said master gear out of mesh with the pinions, the means for throwing said master gear into mesh with the pinions comprising a thrust collar slidable on the wheel axle, manually operable means for sliding said thrust collar and thrust pins interposed between said thrust collar and master gear and working through a part of the wheel hub.

2. In a traction wheel, a hub, a rim having openings therein, spokes connecting said hub and rim, a plurality of feed screws radially movable in relation to said hub and provided at their outer ends with cross heads, traction members having their inner ends attached to said cross heads and their outer ends arranged in the openings of the rim, pinions having a threaded engagement with said feed screws, a master gear for simultaneously revolving all of said pinions, means for shifting said master gear into mesh with said pinions, means for throwing said master gear out of mesh with the pinions, the means for throwing said master gear into mesh with the pinions comprising a thrust collar slidable on the wheel axle, manually operable means for sliding said thrust collar, and thrust pins interposed between said thrust collar and master gear and working through a part of the wheel hub, said thrust pins serving as antifriction roller bearings between the axle and hub.

3. In a traction wheel, a hub, a rim having openings therein, spokes connecting said hub and rim, a plurality of feed screws radially movable in relation to said hub and provided at their outer ends with cross heads, traction members having their inner ends attached to said cross heads and their outer ends arranged in the openings of the rim, pinions having a threaded engagement with said feed screws, a master gear for simultaneously revolving all of said pinions, said cross heads carrying rollers, and the hub embodying flanges against which said rollers travel.

4. In a traction wheel, a hub, a rim having openings therein, spokes connecting said hub and rim, a plurality of feed screws radially movable in relation to said hub and provided at their outer ends with cross heads, traction members having their inner ends attached to said cross heads and their outer ends arranged in the openings of the rim, pinions having a threaded engagement with said feed screws, and a master gear for simultaneously revolving all of said pinions, each of said traction members being formed of a flat metal bar given a quarter twist so as to dispose the inner end portions thereof in parallel and contactual relation to each other where they are attached to the respective cross head.

5. In a traction wheel, a hub, a rim having openings therein, spokes connecting said hub and rim, a plurality of feed screws radially movable in relation to said hub and provided at their outer ends with cross heads, traction members having their inner ends attached to said cross heads and their outer ends arranged in the openings of the rim, pinions having a threaded engagement with said feed screws, and a master gear for simultaneously revolving all of said pinions, certain of said traction members being pivotally connected to certain other traction members between the inner and outer extremities of the latter.

In testimony whereof I affix my signature.

JOHN LA DOW.